Patented July 15, 1941

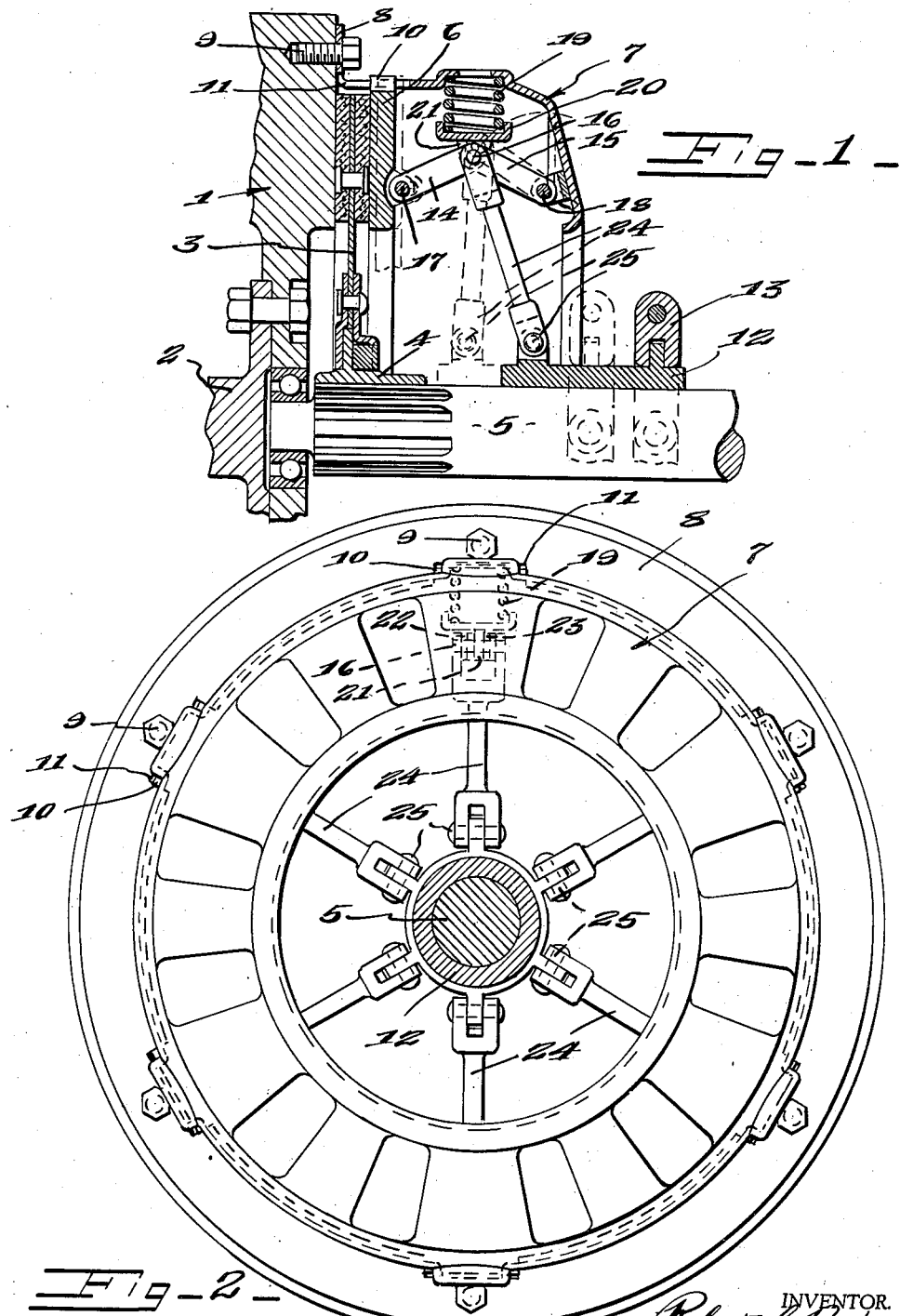

2,249,043

UNITED STATES PATENT OFFICE 2,249,043

CLUTCH

Robert S. Root, Syracuse, N. Y., assignor to W. C. Lipe, Inc., Syracuse, N. Y., a corporation of New York Application January 19, 1940, Serial No. 314,665

4 Claims. (Cl. 192—68)

This invention relates to friction clutches for motor vehicles and the like, and particularly for tractors, and has for its object a particularly simple and efficient clutch operating mechanism, which is self-locking against the action of the clutch spring or springs, when the clutch is "off" or released.

It further has for its object a clutch in which the pressure is applied or the clutch engaged by springs acting through toggle links tending to straighten the toggle links and the operating means includes a part operated by the throw-out sleeve which moves into or beyond a dead center line, when the clutch is released, and hence self-locks the clutch in "off" or released position.

The invention consists in the novel features and in the combinations and constructions hereinafter set forth and claimed.

In describing this invention, reference is had to the accompanying drawing in which like characters designate corresponding parts in all the views.

Figure 1 is a fragmentary longitudinal sectional view of a clutch embodying this invention.

Figure 2 is an elevation, partly in section, looking to the left in Figure 1.

The clutch includes driving and driven members, a pressure ring rotatable with one of said members, a back plate structure, the other of said members including a disk extending between the pressure ring and said one of the members, a clutch shaft on which the disk is slidably splined, and operating mechanism including a sleeve slidable along the clutch shaft, a series of toggle links and springs within the back plate structure thrusting against the toggle links and tending to straighten them and engage the clutch, the links of each pair being pivoted together at like ends forming the joint of the toggle and at their other ends to the pressure ring and the back plate respectively, and motion transmitting means between the sleeve and the toggle embodying a link or part which moves into or beyond a dead center position or has an over-the-center locking action, when the clutch is released, in order to lock the clutch released against re-engagement by the springs. The springs tend to move the toggle towards straightened position, and the motion transmitting means, when operated to release the clutch, tends to fold the toggles against the springs.

In the illustrated embodiment of the invention, the disk is the driven member. I designates the driving member, which is suitably connected to a drive shaft 2, which may be the engine shaft.

3 designates the driven member or disk having a hub 4 slidably splined on the clutch shaft 5. 6 designates the pressure ring and 7 the so-called back plate which is here shown as cup-shaped and formed up of sheet metal, and having an annular peripheral flange 8, which is secured to the driving member 1, as by screws 9. The pressure ring is rotatable with the driving member 1 and is here shown as formed with peripheral lugs 10 interlocking in slots 11 in the back plate.

12 designates the throw-out or operating sleeve movable along the clutch shaft 5. This is operated by any suitable lever through a throw-out collar 13. 14 and 15 designate respectively the toggle links, there being an annular series of toggle links in order to apply the pressure equally throughout the pressure ring 6. Each pair of toggle links is pivoted together at like ends at 16 and at their opposite ends respectively at 17 and 18 to the pressure ring 6 and the back wall of the back plate 7.

19 are clutch springs, there being one spring for each pair of toggle links 14, 15. The springs 19 are here shown as thrusting inwardly radially or toward the axis of the clutch shaft. The springs 19, as here shown, thrust at their outer ends against suitable seats or depressions in the annular wall of the cup-shaped back plate and at their inner ends thrust against seats 20 having lugs 21 pivoted respectively on the pivots 16 of the joints of the toggles. As here shown, the links 14, 15 at their inner ends are bifurcated, the link 15 having the bifurcations 22 and the link 14 having the bifurcations 23 fitted between bifurcations 22, the lug 21 extending between the bifurcations 23. The pivot pin 16 extends through the bifurcations 22, 23 and the lug 21.

The self-locking, over-the-center motion transmitting means between the operating sleeve and each of the toggle links 14 and 15 includes thrust links 24 pivoted at their inner ends at 25 to the sleeve 12 and at their outer ends to the pivot pins 16 of the toggles. Each thrust link 24 is bifurcated at its end and embraces bifurcations of the links 14 and 15, the pivot pin 16 also passing through the bifurcations 25 of the thrust link 24. The springs 19 tend to thrust the toggle links 14, 15 from a folded position toward a straightened position, that is, a straight line passing through the pivots 17 and 18, and when in the position shown in full lines (Figure 1) the clutch is engaged. Any wear of the clutch faces is automatically taken up by the springs forcing the links farther toward straightened position.

When the clutch is disengaged by operating the sleeve 12 to the right, the thrust link 24 is moved into the dotted line position (Figure 1) and the links 14, 15 folded radially outward into the dotted line position, against the re-action of the springs 19. The throw of the sleeve 12 is such that the thrust link moves into or beyond a center line or into a self-locking position to hold the clutch in "off" or disengaged position. Because the springs 19, in the illustrated embodiment of the invention is thrust substantially radially, the center line is a radial line passing through the axis of the joint 16 of the toggle and at a right angle to the shaft 5, when the clutch is in disengaged position. The center line is a continuation of the axis of each coiled spring 19 or the line of force applied by the spring. Hence, when the sleeve 12 is shifted to the left to disengage the clutch, the thrust thereof is transferred to the link 24 at such an angle that the force transferred to the sleeve 12 tends to thrust the sleeve 12 farther to the left.

What I claim is:

1. In a friction clutch including driving and driven members, a pressure ring, a clutch shaft, and a back plate, one of said members being a disk mounted on the clutch shaft and having friction faces between the other of said members and the pressure ring; the combination of operating means including toggles, each comprising toggle links pivoted together at like ends and at their other ends to the pressure ring and the back plate respectively, springs arranged radially relatively to and thrusting against the joints of the toggles and tending to straighten them, an operating sleeve movable along the clutch shaft, and motion transmitting means between the sleeve and each toggle including a part pivoted to the joint of the toggle and extending radially inward to coact with the operating sleeve to fold the toggle and release the clutch when the sleeve is moved in one direction and to move the toggle toward straightened position to permit the springs to engage the clutch when moved in the other direction.

2. In a friction clutch including driving and driven members, a pressure ring, a clutch shaft, and a back plate, one of said members being a disk mounted on the clutch shaft and having friction faces between the other of said members and the pressure ring; the combination of operating means including toggles, each comprising toggle links pivoted together at like ends and at their other ends to the pressure ring and the back plate respectively, springs arranged radially relative to and thrusting against the joints of the toggles and tending to straighten them, an operating sleeve movable along the clutch shaft, motion transmitting means between the sleeve and the toggles to fold the toggles and release the clutch when the sleeve is moved in one direction and to move the toggles toward straightened position to permit the springs to engage the clutch when moved in the other direction, said motion transmitting means including a part movable from one side of a center line extending through the joint of the toggle in the direction of the chord of the arc of movement of the joint of the toggle to the opposite side of said line when shifted by the sleeve into the position assumed when the clutch is "off" to hold the toggles from movement by the springs.

3. In a friction clutch including driving and driven members, a pressure ring, a clutch shaft, and a back plate, one of said members being a disk mounted on the clutch shaft and having friction faces between the other of said members and the pressure ring; the combination of operating means including toggles, each comprising links pivoted together at like ends and at their other ends to the pressure ring and the back plate respectively, the toggles extending in a direction axially of the clutch, springs arranged radially relatively to the axis of the clutch and to the joints of the toggles, these springs thrusting radially against the joints of the toggles and tending to straighten them, an operating sleeve movable along the clutch shaft and thrust links, each pivoted at its opposite ends to the sleeve and to the joint of one of the toggles to transfer the movement of the sleeve to the toggles to fold the toggles against the action of the springs.

4. In a friction clutch including driving and driven members, a pressure ring, a clutch shaft, and a back plate, one of said members being a disk mounted on the clutch shaft and having friction faces between the other of said members and the pressure ring; the combination of operating means including toggles, each comprising links pivoted together at like ends and at their other ends to the pressure ring and the back plate respectively, springs thrusting radially against the joints of the toggles and tending to straighten them, an operating sleeve movable along the clutch shaft, and thrust links, each pivoted at its opposite ends to the sleeve and to the joint of one of the toggles to transfer the movement of the sleeve to the toggle to fold the toggle against the action of the spring, each thrust link being movable during its throw-out movement from one side of a center line passing through the joint of the toggle in the direction of the thrust of the spring to the opposite side of said line to hold the clutch in its "off" position against re-engagement by the springs.

ROBERT S. ROOT.